US006629113B1

(12) United States Patent
Lawrence

(10) Patent No.: US 6,629,113 B1
(45) Date of Patent: Sep. 30, 2003

(54) METHOD AND SYSTEM FOR DYNAMICALLY ADJUSTABLE AND CONFIGURABLE GARBAGE COLLECTOR

(75) Inventor: Kelvin Roderick Lawrence, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,356

(22) Filed: Jun. 30, 1999

(51) Int. Cl.[7] .............................................. G06F 17/00
(52) U.S. Cl. ........................ 707/206; 707/208; 707/200
(58) Field of Search ....................... 707/1–206; 711/1–6; 717/168–170

(56) References Cited

U.S. PATENT DOCUMENTS

| | | | |
|---|---|---|---|
| 5,734,861 A | 3/1998 | Cohn et al. | 395/461 |
| 5,784,553 A | 7/1998 | Kolawa et al. | 395/183.14 |
| 5,787,431 A | 7/1998 | Shaughnessy | 707/100 |
| 5,832,529 A | 11/1998 | Wollrath et al. | 707/206 |
| 5,842,016 A | 11/1998 | Toutonghi et al. | 395/676 |
| 5,845,298 A | 12/1998 | O'Connor et al. | 707/206 |
| 5,848,423 A | 12/1998 | Ebrahim et al. | 707/206 |
| 5,857,210 A | 1/1999 | Tremblay et al. | 707/206 |
| 6,519,615 B1 * | 2/2003 | Wollrath et al. | 707/206 |
| 6,529,909 B1 * | 3/2003 | Bowman-Amuah | 707/10 |
| 6,539,396 B1 * | 3/2003 | Bowman-Amuah | 707/203 |

FOREIGN PATENT DOCUMENTS

EP 0383097 8/1990 .......... G06F/12/08

OTHER PUBLICATIONS

Cook et al., "Semi–automatic, Self–adaptive Control of Garbage Collection Rates in Oject Databases", SIGMOD 96, Jun., 1996.*

Kordale et al., Distributed/concurrent garbage collection in distributed shared memory systems, Object Orientation in Operating Systems, 1993, Proceedings of the Third International Workshop on, Dec. 9–10, 1993, pp. 51–60.*

Willard et al., Autonomous garbage collection: resolving memory leaks in long running network applications, Computer Communications and Networks, 1998, Proceedings, 7th International Conference on, Oct. 12–15, 1998, pp. 886–896.*

Ding et al., Cache performance of chronological garbage collection, Electrical and Computere Engineering, 1998, IEEE Canadadian Conference on, vol. 1, May 24–28, 1998, pp. 1–4, vol. 1.*

Venner, Bill; Inside the Java Virtual Machine; 1998, Chapter 9.

IBM Technical Disclosure Bulletin; International Business Machines Corporation; vol. 37, No. 03, Mar. 1994; Prioritization of Smalltalk Garbage Colletion Based on System Activity, pp 609–610.

IBM Technical Disclosure Bulletin; International Business Machines Corporation; vol. 36, No. 07, Jul. 1993; Dynamic Adjustment of Smalltalk/V Garbage Collection, pp. 33–34.

Java Helps MKS solve Its Cross Platform Portability Problems; I/S Analyzer; vol. 35, No. 9, pp. 2–7, Sep. 1996.

* cited by examiner

Primary Examiner—David Jung
(74) Attorney, Agent, or Firm—Duke W. Yee; Jeffrey S. LaBaw; Betty G. Formby

(57) ABSTRACT

A method, system, and computer-program product for a dynamically adjustable and configurable garbage collector is provided. Values for an environment variable or set of variables or parameters are obtained by the dynamic garbage collector. The variables may be set through user input or upon configuration of a computer platform. The values of the variables may be modified or updated during execution of the garbage collector, which receives or retrieves the newly modified values. The garbage collector then performs memory management functions according to a behavioral algorithm that incorporates the values of the environment variables or parameters or according to a behavioral algorithm that is selected by the environment variable.

34 Claims, 6 Drawing Sheets

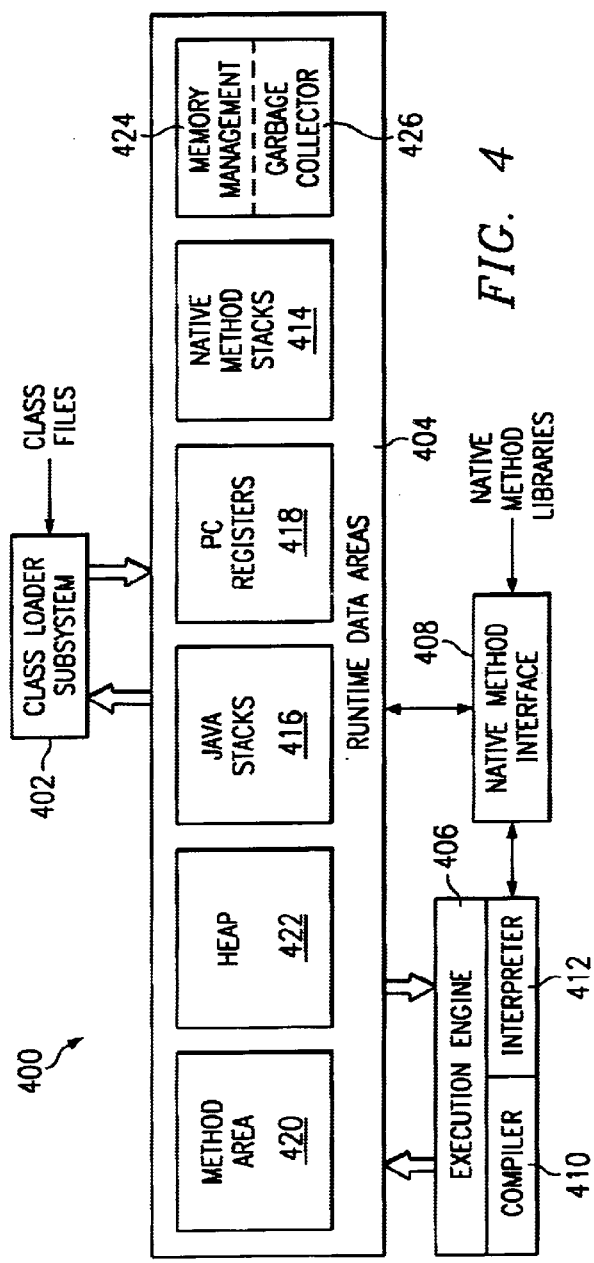

METHOD AND SYSTEM FOR DYNAMICALLY ADJUSTABLE AND CONFIGURABLE GARBAGE COLLECTOR

BACKGROUND OF THE INVENTION

1. Technical Field

The present invention provides an improved data processing system and, in particular, provides a method and apparatus for memory management in a data processing system. Still more particularly, the present invention provides an improved functionality within a garbage collector in a data processing system.

2. Description of Related Art

A virtual machine, such as a Java virtual machine (JVM), typically allocates memory for the instantiation of an object from a free memory area called a heap. The allocation and freeing of memory in the heap is usually allocated and freed in set blocks. A single heap exists within a Java virtual machine instance. A separate heap, however, exists for each instance of the Java virtual machine. Since each application is associated with a single instance of a Java virtual machine, two Java applications will not trample or use each other's heap data. The Java virtual machine has instructions to allocate memory on the heap for a new object but includes no instructions for freeing or deallocating previously allocated memory. Hence, the Java virtual machine is responsible for deciding whether and when to free or deallocate memory occupied by objects that are no longer referenced by a running application. A garbage collector in the Java virtual machine performs garbage collection to reclaim the memory space used by objects that are no longer referenced by an application. The reclaimed memory is then recycled by reallocating the memory space for other objects.

The Java Virtual Machine (JVM) architecture relies heavily on the use of garbage collection as a core part of its memory management strategy. Garbage collection is the name given to the task of: automatically determining which blocks of memory can be freed by marking them as no longer needed by an application when they fall "out of scope" during program execution; collecting all of these blocks of memory at periodic intervals; returning them to the heap; and marking the blocks as available for use. This process of "collecting the garbage" must be done skillfully as the garbage collection process, while freeing resources, can itself consume system resources, particularly processor time.

Virtual machine platforms are an evolving computing platform with Java being the most prevalent of these platforms. One of the most touted features of Java is its portability. With the "write once, run anywhere" concept, it is envisioned that a Java application or applet could run on a mainframe computer, and without modification, also run on a hand-held device, a Personal Digital Assistant (PDA), a printer, or some other output device. Obviously, a PDA and a mainframe computer have widely varying computing resources. A Java virtual machine running on each of these platforms may have widely varying amounts of memory or bandwidth at its disposal, and a properly designed JVM should take advantage of the available resources while accomplishing the goal of portability. In order to achieve these goals with respect to memory management, it is desirable to have a single design of a JVM that addresses the common problems of performance and portability.

The exact garbage collection strategy used by a JVM will vary depending on the type of system upon which the JVM is executing. In current JVM implementations, the garbage collector is a "built-in" component in the JVM, i.e. different garbage collectors cannot be plugged in for different circumstances. Hence, the deployment of a particular JVM for a particular computer platform usually dictates the garbage collection strategy that will be employed within the JVM.

Many different algorithms have been employed in different garbage collector implementations. These algorithms are typically tailored to the type of environment in which the Java programs are executing. For example, server applications in a multi-user multiprocessor environment tend to have a memory-use profile that differs from a desktop computer environment. Furthermore, embedded-Java devices, such as cell phones, and handheld devices, such as those that use the Microsoft WinCE operating system, have different memory-use profiles.

Maintaining different garbage collectors for different JVMs can be expensive for providers of JVMs. A single garbage collector is designed to implement one particular strategy and cannot be modified "on-the-fly" to change its strategy, and a single garbage collector is built into each JVM instance depending upon the computer platform on which the JVM executes. Providers of JVMs must then track, service, and support these JVM instances.

Moreover, one cannot guarantee that an installed JVM will have a given level of performance. On any given day, a particular set of garbage collection characteristics, i.e. garbage collection algorithm metrics, will be better for one device but possibly not for another device. For example, a device with a small amount of memory may require a very aggressive garbage collector whereas as a large server with lots of memory may require a relaxed approach. However, if at some later point in time, more memory is added to a device that already has an installed JVM, the garbage collection strategy of the JVM cannot be modified to conform with the larger amount of memory. In another example, a server with an installed JVM may be modified by adding additional processors. In each case, a different JVM would need to be installed with a different type of garbage collection algorithm in order to adapt the performance of the garbage collector to the performance characteristics of the hardware platform. Reinstallation of a complete Java environment may be expensive and time-consuming.

Therefore, it would be advantageous to have an improved method and apparatus for managing memory in a data processing system. It would be particular advantageous to have a method and apparatus for managing memory with an improved garbage collector.

SUMMARY OF THE INVENTION

The present invention provides a method, system, and computer-program product for a dynamically adjustable and configurable garbage collector. Values for an environment variable or set of variables or parameters are obtained by the dynamic garbage collector. The variables may be set through user input or upon configuration of a computer platform. The values of the variables may be modified or updated during execution of the garbage collector, which receives or retrieves the newly modified values. The garbage collector then performs memory management functions according to a behavioral algorithm that incorporates the values of the environment variables or parameters or according to a behavioral algorithm that is selected by the environment variable.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts a block diagram of a Java virtual machine in accordance with a preferred embodiment of the present invention;

FIGS. 10A–10B are tables which depict groups of settings that enable a garbage collector to dynamically choose a predefined configuration.

DETAILED DESCRIPTION OF THE PREFERRED EMBODIMENT

Figure 1:
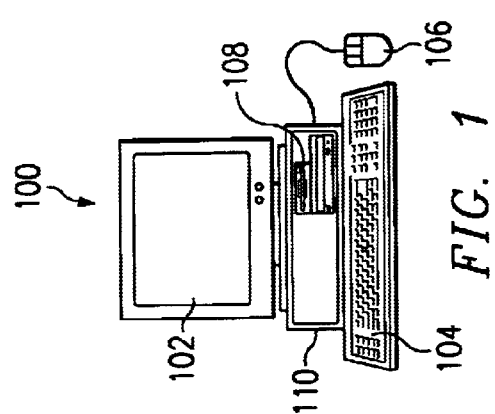
FIG. 1 is a pictorial representation depicting a data processing system in which the present invention may be implemented in accordance with a preferred embodiment of the present invention.

With reference now to FIG. 1, a pictorial representation depicts a data processing system in which the present invention may be implemented in accordance with a preferred embodiment of the present invention. A personal computer 100 is depicted, which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International Business Machines Corporation, located in Armonk, N.Y. Although the depicted representation shows a personal computer, other embodiments of the present invention may be implemented in other types of data processing systems, such as network computers, Web based television set top boxes, Internet appliances, etc. Computer 100 also preferably includes a graphical user interface that may be implemented by means of system software residing in computer readable media in operation within computer 100.

Figure 2:
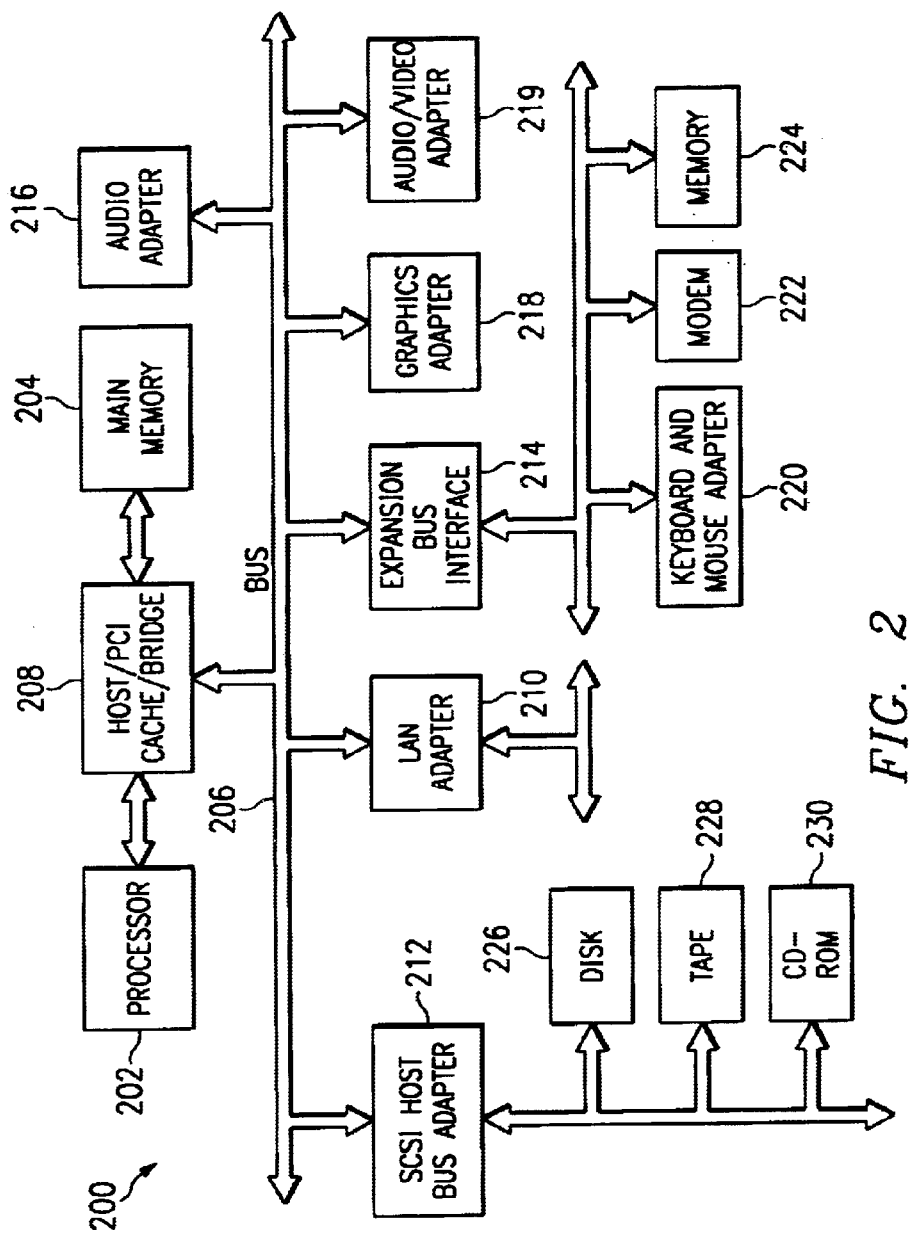
FIG. 2 is a block diagram illustrating internal components of a data processing system that may implement the present invention.

With reference now to FIG. 2, a block diagram illustrates internal components of a data processing system that may implement the present invention. Data processing system 200 is an example of a personal computer, such as computer 100 in FIG. 1. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

Other examples for data processing system 200 include an Internet information appliance for surfing the Internet and the World Wide Web. Internet information appliances may include Web-based interactive television set-top boxes. The depicted example in FIG. 2 and above-described examples are not meant to imply architectural limitations.

Figure 3:
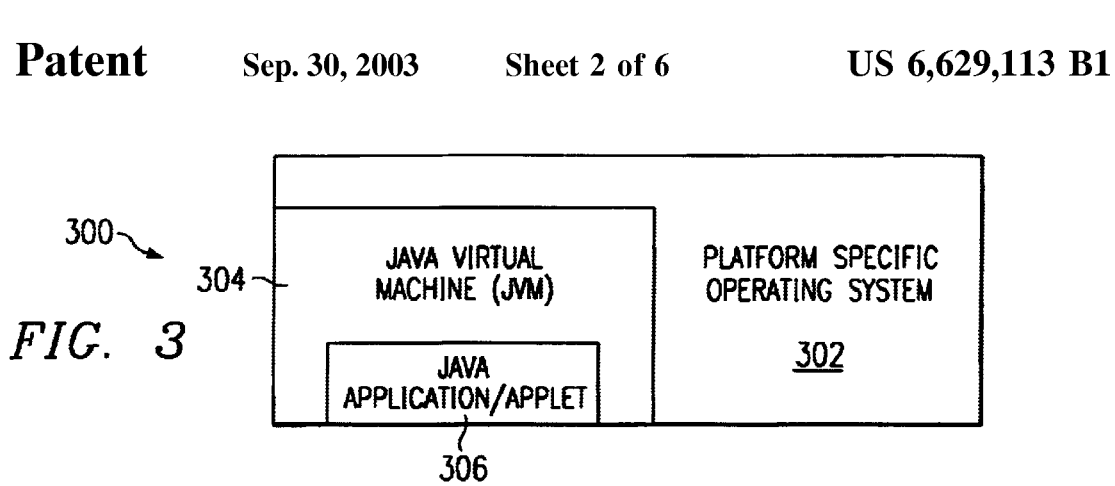
FIG. 3 is a block diagram illustrating the relationship of software components operating within a computer system that may implement the present invention.

With reference now to FIG. 3, a block diagram illustrates the relationship of software components operating within a computer system that may implement the present invention. Java-based system 300 contains platform specific operating system 302 that provides hardware and system support to software executing on a specific hardware platform. Java Virtual Machine (JVM) 304 is one software application that may execute in conjunction with the operating system. JVM 304 provides a Java runtime environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded pico-Java core.

The present invention provides a method and system for a dynamically adjustable configurable garbage collector. Hence, the present invention operates in conjunction with a Java virtual machine yet within the boundaries of a JVM as defined by Java standard specifications. In order to properly present the present invention, portions of the operation of a Java virtual machine according to Java specifications are herein described.

At the center of a Java runtime environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

A JVM must load class files and execute the bytecodes within them. The Java virtual machine contains a class loader, which loads class files from an application and the class files from the Java application programming interfaces (APIs) which are needed by the application. The execution engine that executes the bytecodes may vary across platforms and implementations.

The simplest type of software-based execution engine is a just-in-time compiler. With this type of execution, the bytecodes of a method are compiled to native machine code upon the first invocation of the method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java runtime environment may have two kinds of methods: Java and native. A Java method is written in the Java language, compiled to bytecodes, and stored in class files. A native method is written in Java or some other language and compiled to the native machine code of a particular processor. Native methods are stored in a dynamically linked library whose exact form is platform specific.

With reference now to FIG. 4, a block diagram of a Java virtual machine is depicted in accordance with a preferred embodiment of the present invention. Java virtual machine (JVM) 400 includes a class loader subsystem 402, which is a mechanism for loading types, such as classes and interfaces, given fully qualified names. JVM 400 also contains runtime data areas 404, execution engine 406, native method interface 408, and memory management 424. Execution engine 406 is a mechanism for executing instructions contained in the methods of classes loaded by class loader subsystem 402. Execution engine 406 may be, for example, Java interpreter 412 or just-in-time compiler 410. Native method interface 408 allows access to resources in the underlying operating system. Native method interface 408 may be, for example, a Java native interface.

Runtime data areas 404 contain native method stacks 414, Java stacks 416, PC registers 418, method area 420, and heap 422. These different data areas represent the organization of memory needed by JVM 400 to execute a program.

Java stacks 416 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. A JVM does not have any registers for holding intermediate values; any Java instruction that requires or produces an intermediate value uses the stack for holding the intermediate values. In this manner, the Java instruction set is well-defined for a variety of platform architectures.

PC registers 418 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 414 store the state of invocations of native methods. The state of native method invocations is stored in an implementation-dependent way in native method stacks, registers, or other implementation-dependent memory areas.

Method area 420 contains class data while heap 422 contains all instantiated objects. The JVM specification strictly defines data types and operations. The data types can be divided into a set of primitive types and a reference type. Reference values refer to objects, but primitive values are actual data.

All JVMs have one method area and one heap, each of which are shared by all threads running inside the JVM. When the JVM loads a class file, it parses information about a type from the binary data contained in the class file. It places this type information into the method area. Each time a class instance or array is created, the memory for the new object is allocated from heap 422. JVM 400 includes an instruction that allocates memory space within the memory for heap 422 but includes no instruction for freeing that space within the memory. Memory management 424 in the depicted example manages memory space within the memory allocated to heap 420. Memory management 424 may include garbage collector 426 which automatically reclaims memory used by objects that are no longer referenced by an application. Additionally, a garbage collector also may move objects to reduce heap fragmentation.

Figure 5:
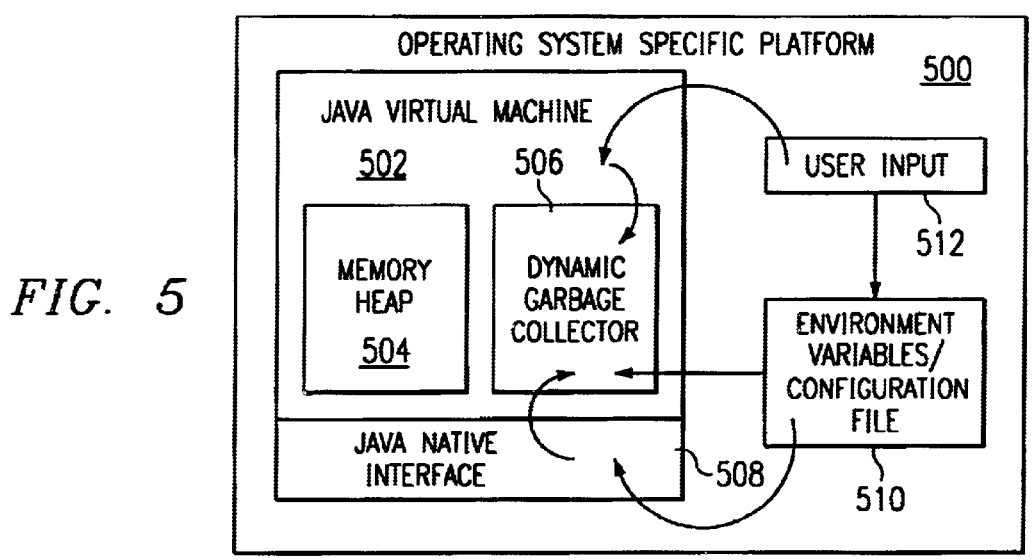
FIG. 5 is a block diagram depicting the data flow among software components and data files in a data processing system that implements the present invention.

With reference now to FIG. 5, a block diagram depicts the data flow among software components and data files in a data processing system that implements the present invention. Operating system specific platform 500 contains Java virtual machine 502 that is similar to JVM 304 described above in FIG. 3 above. JVM 502 also has memory heap 504 and Java native interface 508 that are similar to heap 422 and native method interface 408 described above in FIG. 4.

JVM 502 also contains dynamic garbage collector 506 that provides some memory management functions such as garbage collection and memory deallocation. Dynamic garbage collector 506 differs from garbage collector 426 in FIG. 4 as dynamic garbage collector 506 may dynamically receive configuration parameters from the runtime environment outside of JVM 502. In the most common case, user input 512 sets environment variables 510 that are then read or received by dynamic garbage collector 506. For example, in the DOS operating system, a user may set environment variables within the "autoexec.bat" file, and these variables are available in the runtime environment for various applications. In this case, a user may set environment variables specifically for a dynamic garbage collector that then monitors the runtime environment for changes in those environment variables or performs some type of action to receive updates of those environment variables. In another example, the Microsoft Windows operating system provides registry files that may be used to set environment variables for various applications.

In yet another example, a configuration file may be used to store environment variables that are specifically directed for use in dynamic garbage collector 506. Dynamic garbage collector 506 may then parse the configuration file to obtain configuration parameters for its execution. Dynamic garbage collector 506 may read the configuration file directly without the use of intervening software. In the Java runtime environment, values may be stored in property files that are associated with Java applications.

Although dynamic garbage collector 506 may contain modules for direct user interaction, it is contemplated that dynamic garbage collector 506 executes in a non-interactive manner. JVM 502 may provide a lightweight application or applet that accepts user input 512 and sets variables within JVM 502 that are passed to or retrieved by dynamic garbage collector 506. This type of arrangement allows dynamic garbage collector 506 to consist primarily of code directed to memory management functions. One other manner that dynamic garbage collector 506 may receive updates of configuration parameters is via interaction between dynamic garbage collector 506 and Java native interface 508. In this case, Java native interface 508 may contain code that interacts with operating system specific platform 500 to receive notifications of changes to environment variables or to monitor for changes to environment variables. Dynamic garbage collector 506 may then receive or retrieve updates to environment variables from Java native interface 508. Specific methods for receiving and retrieving values for environment variables are described in more detail further below.

One manner in which the dynamic garbage collector may receive dynamic values, which are herein alternately termed environment variables, control variables, behavioral parameters, etc., is to extend the System class within the JVM. By adding methods to this class that allow a Java application to call the dynamic garbage collector's application programming interfaces (APIs), an application may pass external values into the garbage collector. For example, a method called "System.setGCProperties( )" could be used to set the behavioral properties of the garbage collector.

Figure 6:
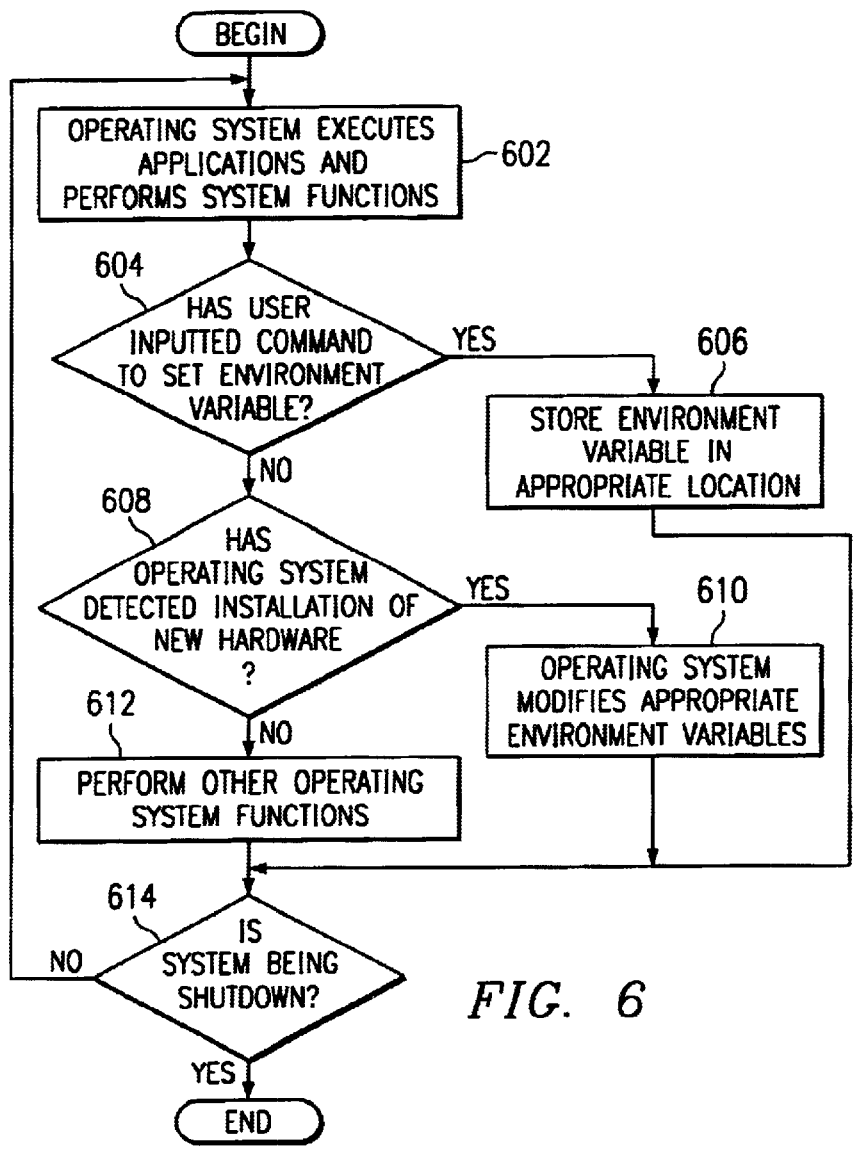
FIG. 6 is a flowchart depicting a process for setting and storing environment variables to be used within a dynamic garbage collector.

With reference now to FIG. 6, a flowchart depicts a process for setting and storing environment variables to be used within a dynamic garbage collector. The process begins with an operating system executing applications and performing system functions (step 602). A determination is then made as to whether a user has input a command to set an environment variable (step 604). If so, then the operating system stores the new value of the environment variable in the appropriate location for subsequent communication to the dynamic garbage collector (step 606). A user may input a command to set an environment variable either through a graphical user interface or through a command line interface.

If a user has not input a command, then a determination is made as to whether any new hardware has been installed (step 608). If so, the operating system may determine parameters for the type and location of the new hardware and modify the appropriate environment variables within the operating system (step 610). The operating system may then continue with other functions. If there is no new hardware installed, then the operating system performs other system functions (step 612). A determination is then made as to whether the computer system is being shut down (step 614). If not, then the process loops back to step 602 to check for other system functions and duties. If the system is being shut down, then the process completes. In this manner, the steps in FIG. 6 describe an essentially non-terminating loop within an executing operating system. As changes to environment variables are made, the operating system stores new values for the environment variables during its regular course of actions.

Figure 7:
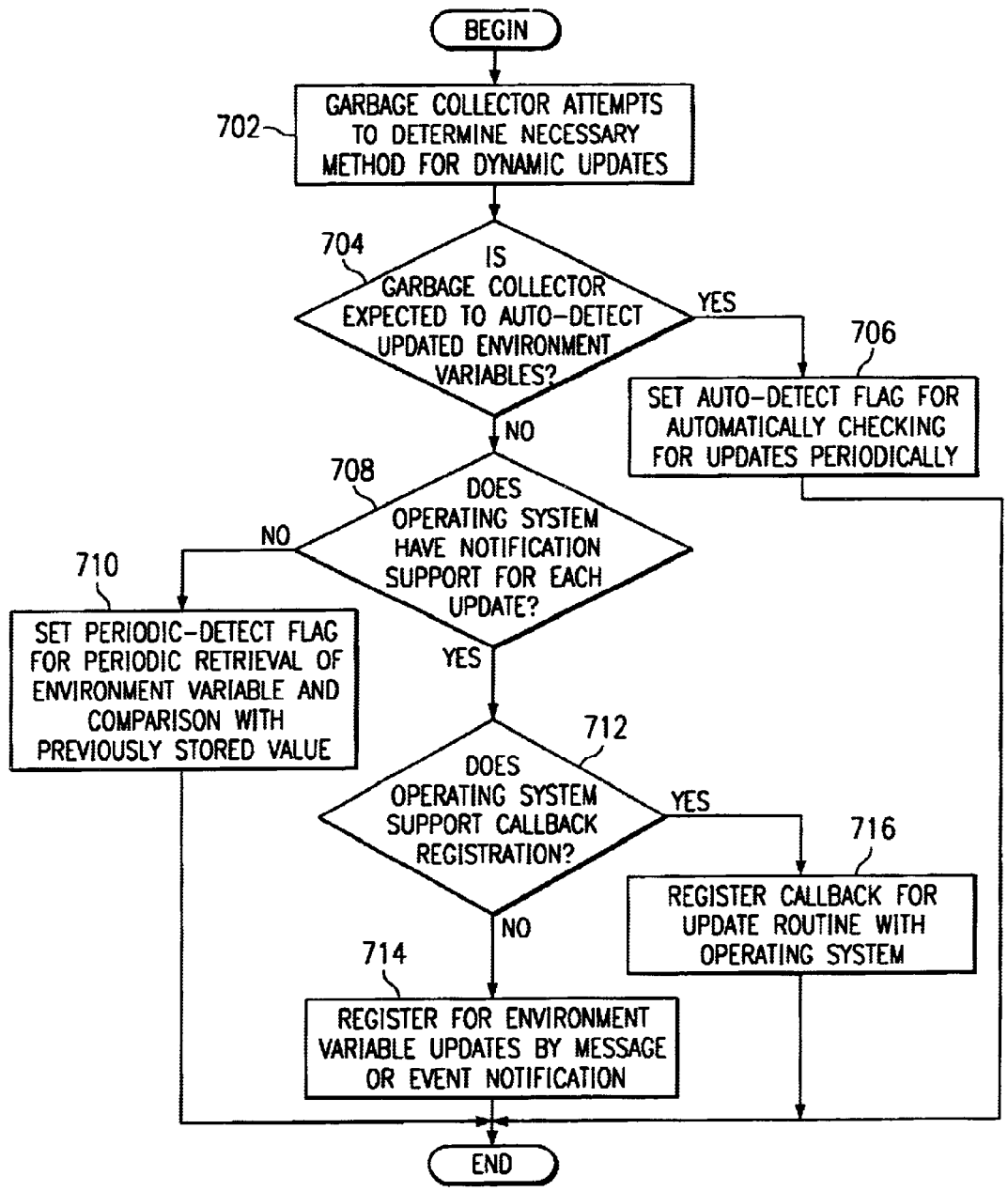
FIG. 7 is a flowchart depicting a process by which a dynamic garbage collector configures itself for the proper update procedures in its current execution environment.

With reference now to FIG. 7, a flowchart depicts a process by which a dynamic garbage collector configures itself for the proper update procedures in its current execution environment. The process begins when a garbage collector attempts to determine the necessary method for receiving dynamic updates of configuration variables or parameters (step 702). Generally, this type of process is performed upon initial execution of the dynamic garbage collector by an operating system such as a Java virtual machine.

A determination is made as to whether the dynamic garbage collector is able to auto-detect updated environment variables (step 704). If so, then the dynamic garbage collector sets an auto-detect flag for automatically checking for updates to environment or configuration parameters periodically (step 706). This type of auto-detection may be performed through the use of software interrupts, etc. The initiation process is then completed.

If the dynamic garbage collector can not auto-detect updated environment variables, then a determination is made as to whether the operating system has support for notifying the dynamic garbage collector of each update to an environment variable (step 708). If so, a determination is made as to whether the operating system supports callback registration (step 712). If so, then the dynamic garbage collector registers an update routine for callbacks within the operating system (step 716). The process then completes. If the operating system does not support callback registration, then the dynamic garbage collector registers for notification of environment variable updates (step 714). The dynamic garbage collector may receive these notifications in the form of messages, events, or some type of software interrupt that triggers the dynamic garbage collector to retrieve the updated value of the environment variable. The process then completes.

If the operating system does not have notification support for each update, then the dynamic garbage collector sets a periodic-detect flag for periodic retrieval of environment variables and subsequent comparison with previously stored values of the required environment variables (step 710). The process is then completed, at which point the garbage collector may continue initiation procedures or may enter an inactive state awaiting appropriate actions from the operating system.

Figure 8:
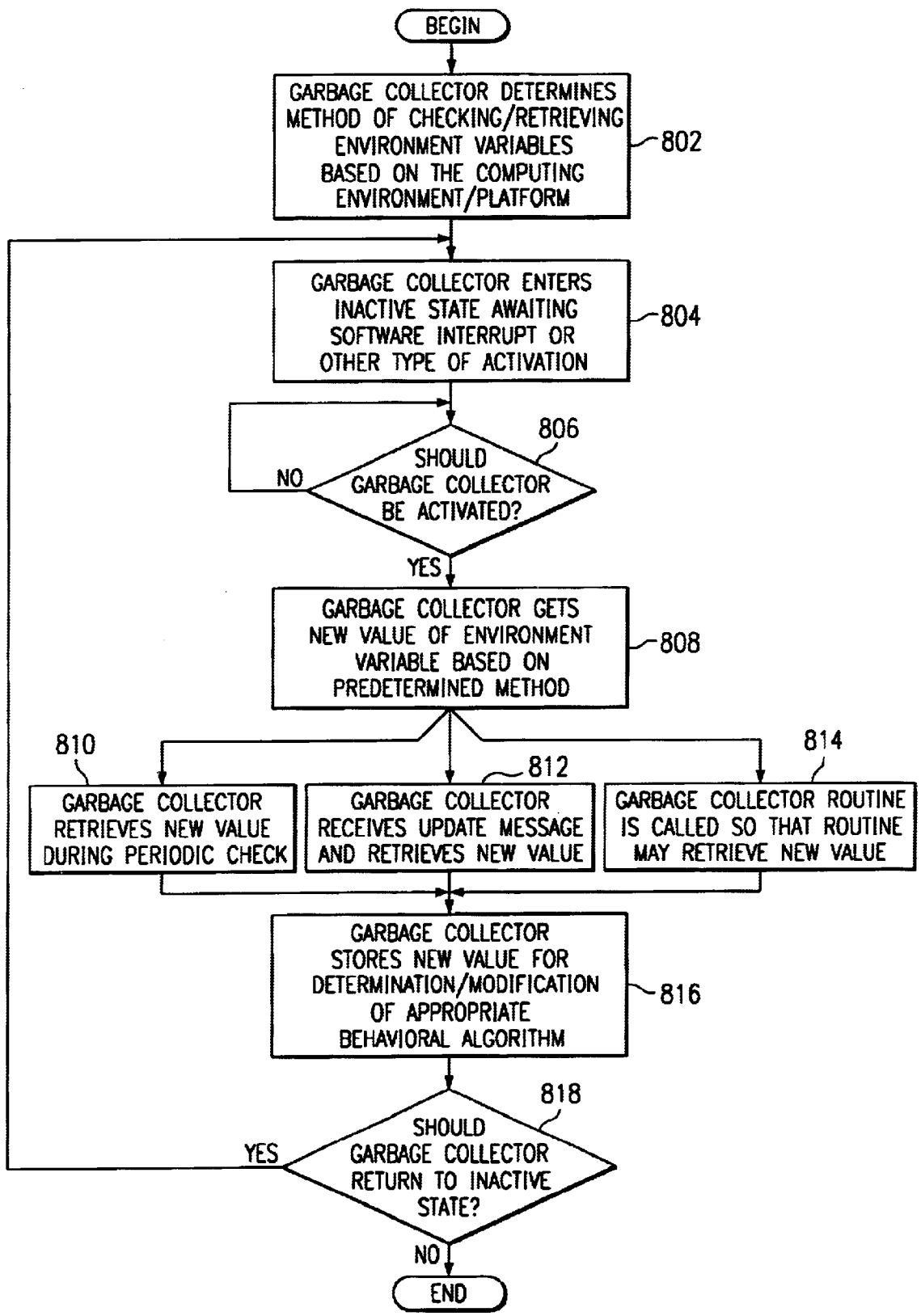
FIG. 8 is a flowchart depicting a process by which a garbage collector receives updated values of environment variables in order to dynamically configure the garbage collector.

With reference now to FIG. 8, a flowchart depicts a process by which a garbage collector receives updated values of environment variables in order to dynamically configure the garbage collector. The process begins with a dynamic garbage collector determining a method of checking or retrieving environment variables based on the computing environment or platform (step 802). The process of determining the proper method for obtaining environment variables may be similar to that shown in FIG. 7. After determining the method, the dynamic garbage collector enters an inactive state awaiting a software interrupt or other type of activation (step 804). A determination is made as to whether the garbage collector should be activated (step 806). If not, then the garbage collector remains in an inactive state. If so, then the garbage collector gets the new value of the environment variable based on its predetermined method (step 808).

FIG. 8 depicts three methods by which the dynamic garbage collector may obtain a new value for an environment variable. For example, the dynamic garbage collector may retrieve the new value during a periodic check (step 810). This type of execution may be performed when the dynamic garbage collector has predetermined that it is responsible for monitoring a set of environment variables to detect an update of one or more control variables or parameters within a set of environment variables. Depending on the implementation, the values of the environment variables may be within an operating system specific platform file, or if the dynamic garbage collector is implemented as part of a Java virtual machine, the value of the control variable may be located within the Java virtual machine. Alternatively, the dynamic garbage collector may be part of the memory management in a Java virtual machine, and the necessary control variable may be stored within an operating system specific platform file. The dynamic garbage collector retrieves the new value of the updated variable or parameter and stores the new value for selection or modification of a behavioral algorithm within the dynamic garbage collector.

As an alternative method, the dynamic garbage collector may receive an update message that notifies the garbage collector that the environment variable has been updated, and the dynamic garbage collector retrieves the new value of the environment variable from the appropriate location (step 812). This may be the case when the dynamic garbage collector has registered for a notification of an update of a control variable or parameter yet relies on some other system function to detect the update of the control variable or parameter. The dynamic garbage collector may receive the updated value within the update message or may retrieve the new value from the appropriate location upon receiving the update message. In either case, the dynamic garbage collector may then select or modify the appropriate behavioral algorithm based on a value of the updated control variable or environment variable.

In yet another example of a manner in which a dynamic garbage collector may obtain a new value, a routine within the dynamic garbage collector may be called so that the routine may retrieve the new value (step 814). This may occur if the dynamic garbage collector has registered a routine to be called for notification of an update of the control variable or environment variable. In this case, the dynamic garbage collector relies on a system function to monitor or detect an update of an environment variable through hardware configuration, user input, etc.

If the dynamic garbage collector has been implemented as part of a Java virtual machine, then the routine may be registered as a hook. A hook is a callback routine that is registered with a system so that it may be notified of the occurrence of an event. This type of mechanism allows a routine to insert itself into the control flow associated with the event. If some type of, action is required by the routine in response to the event, then the routine may perform some function and return control to the point at which the routine was called. Otherwise, if no action is necessary, then the routine simply returns control back to the caller of the routine. In this manner, the routine provides a "hook" that allows the system to "call back" to the routine when necessary.

No matter which method is employed to obtain the new value of the environment variable, the dynamic garbage collector may store the new value for determination and modification of the appropriate behavioral algorithm within the dynamic garbage collector (step 816). A determination is then made as to whether the dynamic garbage collector should return to an inactive state (step 818). If so, then the dynamic garbage collector loops back to (step 804). If not, then the process is completed with respect to obtaining a new control variable value.

Figure 9:
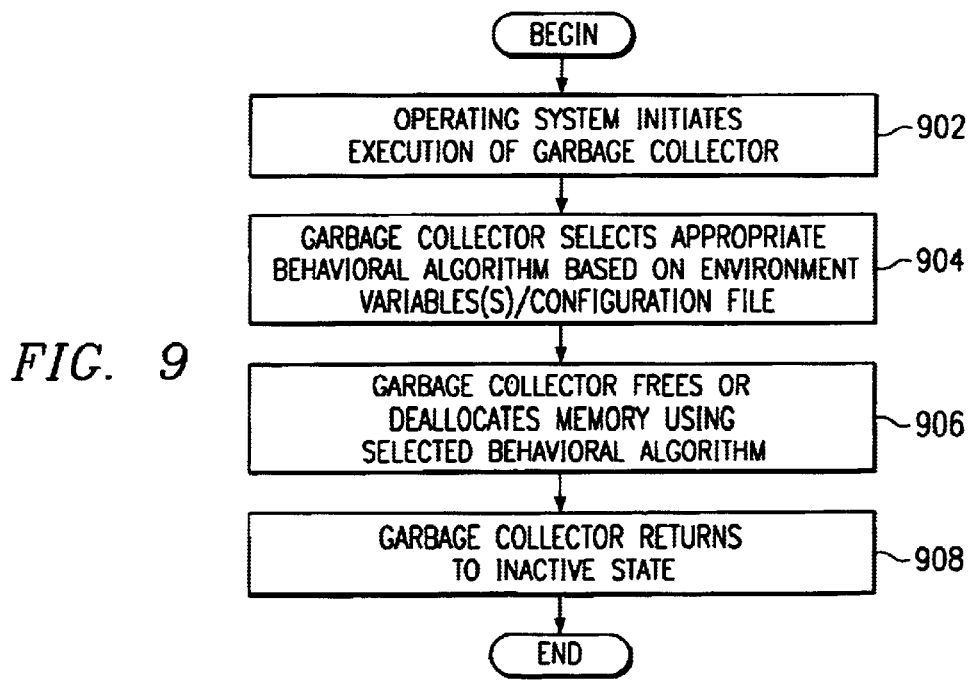
FIG. 9 is a flowchart depicting a process by which a dynamic garbage collector operates in accordance with the present invention.

With reference now to FIG. 9, a flowchart depicts a process by which a dynamic garbage collector operates in accordance with the present invention. The process begins with the operating system initiating execution of the garbage collector (step 902). The dynamic garbage collector can select an appropriate behavioral algorithm based on environment variables or values in a configuration file or can modify a behavioral algorithm according to parameters represented by the environment variables (step 904). The dynamic garbage collector then frees or deallocates memory using the selected or modified behavioral algorithm (step 906). Once the garbage collector has completed its memory management functions, the dynamic garbage collector returns to an inactive state for a period of time until the operating system reinitiates its execution (step 908).

FIG. 9 describes the recurring process of an operating system executing a dynamic garbage collector when the operating system determines the need for memory management functions. The dynamic garbage collector performs these memory management functions according to a behavioral algorithm that has been selected and/or modified through the use of environment variables or parameters obtained through a variety of methods. The methods for obtaining these variables are described with respect to FIGS. 4–8. FIG. 5 shows several types of data flows through which the dynamic garbage collector may receive or obtain data that sets the behavioral algorithm of the garbage collector dynamically. FIG. 6 shows an example by which the operating system may assist the storage of environment variables through user input or system configuration. FIG. 7 shows how an operating system may provide runtime support for passing updates to the garbage collector dynamically so that the garbage collector does not need to be halted for reconfiguration purposes. FIG. 8 shows the manner in which a garbage collector may receive the updated values of environment variables and parameters without a disruptive reconfiguration process to the garbage collector.

Figure 10B:
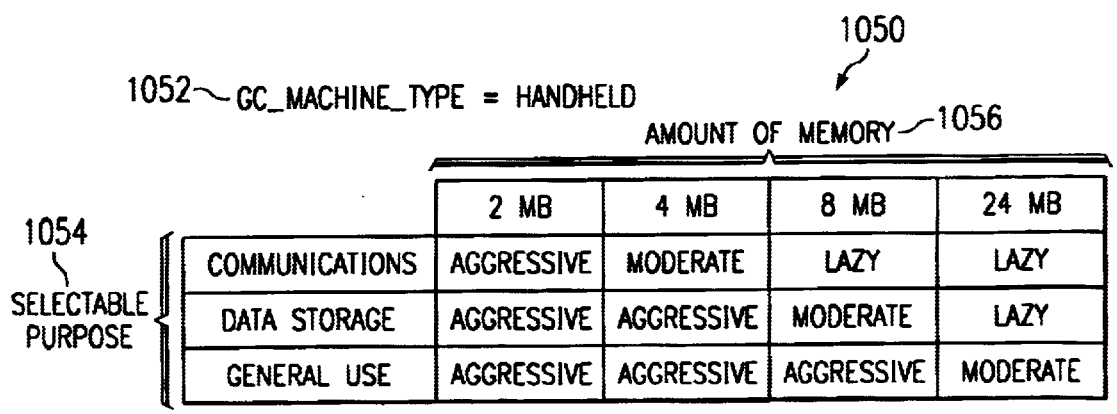

With reference now to FIGS. 10A–10B, the tables depict groups of settings that enable a garbage collector to dynamically choose a predefined configuration. FIG. 10A shows table 1000 that may be used when environment variable 1002 called GC_MACHINE_TYPE has a value SERVER. At some point in time, the environment variable called GC_MACHINE_TYPE has been set to match the type of computing platform on which the garbage collector is executing. In this case, the garbage collector is executing on a server that may vary in its configuration. Table 1000 has one dimension showing amount of memory 1006 and processor speed 1004. Depending on the configuration of the server, entries in table 1000 depict a parameter for a behavioral algorithm to be used by a dynamic garbage collector. As the amount of memory increases, the parameter for the behavioral algorithm decreases in its value. When the server has 256 MB of memory, the dynamic garbage collector may express an aggressive behavior in the manner in which it performs its memory management functions.

When the server has 2 GB of memory, the behavioral algorithm parameter has been set so that the dynamic garbage collector expresses a lazy manner for performing memory management functions. In a similar manner, when the processor speed of the server varies, the behavior expressed by the dynamic garbage collector may also vary. For example, when the server has 2 GB of memory and a processor speed of 133 MHz, the dynamic garbage collector may express a lazy behavior. However, when the server has 2 GB of memory and a processor speed of 750 MHz, the dynamic garbage collector may express an aggressive behavior. In this example, as the amount of memory increases, a system administrator may have selected environment variables or configuration parameters after determining that a larger amount of memory within the server would allow a more relaxed behavior from the dynamic garbage collector. On the other hand, a system administrator may have determined that a faster processor speed allows a dynamic garbage collector to perform memory management functions more often without impinging on the overall performance of the server. Therefore, the system administrator may set the environment variables such that the dynamic garbage collector expresses a more aggressive behavior at faster speeds.

FIG. 10B shows table 1050 that has been configured when environment variable 1052 called GC_MACHINE_TYPE has a value equal to HANDHELD. In this case, the environment variable that specifies the type of computing platform on which the dynamic garbage collector is to execute has been set so that the garbage collector may be informed that it is executing on a PDA or other type of handheld computing device. In this case, table 1050 has a dimension for amount of memory 1056 and another dimension for selectable purpose 1054. The amount of memory scales the behavior of the dynamic garbage collector in a manner similar to that described with respect to FIG. 10A.

However, in FIG. 10B, the purpose for which a user is employing the handheld device has been selected through appropriate user input. The user input for the selectable purpose may then be used to index into the table to select the appropriate behavior of the dynamic garbage collector. For example, if a user has configured the handheld device with 8 MB of memory and primarily uses the handheld device for communications purposes, such as receiving and transmitting e-mail, the dynamic garbage collector may have a lazy behavior. If the user primarily uses the handheld device for data storage purposes, such as keeping calendar information and other types of documents, then the dynamic garbage collector may express a moderate behavior. If the user of the handheld device has selected a general use category for the purpose of the handheld device, then the table may direct the dynamic garbage collector to express an aggressive behavior towards its memory management functions. The aggressive behavior for a general use purpose may express the most efficient operation of the dynamic garbage collector under a variety of circumstances that can not be known beforehand.

In the tables shown in FIGS. 10A–10B, it is contemplated that the settings for the behavioral algorithms within the dynamic garbage collector, such as lazy, moderate, and aggressive, provide an overall direction for the operation of the behavioral algorithm within the dynamic garbage collector. However, each entry in the table for a particular computing platform may consist of a set of parameters that are used within the behavioral algorithm of the dynamic garbage collector. In other words, each entry in the table may have certain characteristics that dictate the manner in which the garbage collector operates. For example, each entry could have a temporal value that dictates the frequency of the memory management actions of the garbage collector.

The descriptors of "lazy" behavior versus "aggressive" behavior is a manner of describing a range or spectrum of actions that are correlated with temporal aspects of the dynamic garbage collector's processing. An overriding goal with most system designs is to maximize performance while minimizing ancillary impacts on other portions of the system. The processes of the garbage collector can be quantified by actions within specific periods of time, and the qualifiers "lazy" and "aggressive" attempt to capture any aspect or characteristic of the garbage collector that relate to processes within periods of time. For example, lazy behavior may be understood to mean that the overhead associated with garbage collecting should be kept to a minimum, and the garbage collector should operate only when absolutely necessary, e.g., when the amount of available memory becomes relatively low. Aggressive behavior may be understood to mean that the overhead associated with garbage collecting should be relatively ignored. In this configuration, the garbage collector should operate relatively often, even in circumstances when the processor already has a relatively heavy processing load. An important point to note is that the dynamic garbage collector has a range of customizable behavior that is quantifiable certain aspects.

Another parameter may dictate the amount of processor time that the garbage collector may consume each time that the garbage collector is activated. Another parameter could dictate the number of objects in memory or memory blocks that are to be inspected by the garbage collector for each execution of the garbage collector. In other words, one parameter may set that the garbage collector is to be activated every 500 milliseconds. However, if the device is configured with more memory, then a corresponding parameter may be increased so that the garbage collector executes with a frequency of 1000 milliseconds. If the platform device has a faster processor speed, then the garbage collector may be allowed to execute for a longer period of time upon each initiation of its memory management functions. In that case, it could be determined that the garbage collector should process for the longer period of time because the faster processor speed may allow other concurrently executing applications to execute in a shorter amount of time.

Another parameter within a table entry may dictate that all objects in memory should be checked by the garbage collector for deallocation when the amount of memory is relatively small versus a situation in which a smaller number of objects stored in memory may be checked when the amount of memory is greater. In this manner, the aggressive behavior versus the lazy behavior of an algorithm within the dynamic garbage collector may consist of other parameters that provide measurable characteristics for the operation of the dynamic garbage collector. These settings then provide a user or system administrator with the ability to set a low, moderate, or high performance for the dynamic garbage collector. Alternatively, an environment variable acting as a toggle switch may allow a user to turn on and off the memory management actions of a garbage collector. In this instance, a system developer debugging an application can eliminate actions of the dynamic garbage collector from considerations of software bugs.

Other environment variables and parameters may be used to set characteristics of the dynamic garbage collector. In addition to the selectable purposes shown in FIG. 10B, a parameter may allow the specification of real-time data processing. In addition to the clock speed of a processor and the amount of memory installed in the data processing system in which the dynamic garbage collector is installed, as shown in FIG. 10A, a parameter may specify the number of processors installed in the data processing system. Other computing platforms that may be specified through a variable that indicates the machine type of the data processing system may include a workstation, a desktop computer, a notebook computer, an embedded computer, or a mainframe computer in addition to the server and handheld computers shown in FIGS. 10A–10B.

Other runtime considerations may be used to set the appropriate environment variables for the dynamic garbage collector. The installation of a particular type of software application may dictate that particular garbage collector actions should be followed for one or more types of installed applications. For example, if a particular installed application requires that the largest possible amount of free memory always be available, no matter whether this incurs a performance reduction, then the environment variables may be set so that the dynamic garbage collector always exhibits an aggressive behavior. As a further modification however, rather than always exhibiting an aggressive behavior when a particular type of application is installed, the dynamic garbage collector may exhibit an aggressive behavioral strategy only when one or more of these types of applications are executing. The dynamic garbage collector would then exhibit a more moderate behavioral strategy when such applications were not executing.

As another consideration of the runtime environment, a system administrator may schedule particular applications to execute at particular times of the day or particular days of the week. In this case, the dynamic garbage collector could be configured such that it exhibits particular behavioral strategies on a specified schedule. In this manner, the user or system administrator can then vary the behavior strategy based on the processing load that will be placed on the data processing system. For example, if the system administrator knows that particular payroll or accounting applications that are memory intensive will be executed at a particular time of the week, then the behavioral strategy of the garbage collector may be set to correspond to this particular processing load. Alternatively, the system administrator may set up a properties file that is associated with the application in order to match the behavior of the dynamic garbage collector with the runtime profile of the application for each instance in which the application is executed.

The advantages provided by the present invention should be apparent in light of the detailed description provided above. A single code base for a garbage collector may be provided such that a single garbage collector provides varying performance and behavioral characteristics within an operating system that may be deployed on a variety of computing platforms. The dynamic garbage collector may be effectively table driven according to varying algorithms, computing platform parameters, etc. This allows the garbage collector to exhibit scalability depending on the amount of memory and the number of processors in the deployed data processing system. When the dynamic garbage collector is implemented within a Java virtual machine, a single dynamic garbage collector may be used in a variety of computing platforms in which completely different instances of Java virtual machines would have previously been needed to obtain the desired performance.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing memory in a data processing system, the method comprising the computer-implemented steps of:

receiving, from an executing application, a configuration parameter for a garbage collector; and managing deallocation of memory by the garbage collector executing in the data processing system according to a behavioral algorithm based on the configuration parameter.

2. The method of claim 1 wherein the configuration parameter selects one of a set of garbage collection algorithms.

3. The method of claim 1 further comprising:

operating the garbage collector in one of a plurality of garbage collecting modes; and dynamically switching between garbage collection modes by setting the configuration parameter in the configuration file.

4. The method of claim 1 wherein the data processing system comprises a Java runtime environment.

5. The method of claim 4 further comprising:

monitoring a set of environment variables for the data processing system;

detecting an update of the control variable in the set of environment variables;

retrieving a value of the updated control variable by the garbage collector; and selecting the behavioral algorithm based on the value of the updated control variable.

6. The method of claim 4 wherein the control variable represents one or more characteristics of the data processing system selected from the group of:

an amount of memory installed in the data processing system;

a number of processors installed in the data processing system;

a clock speed of a processor installed in the data processing system;

a machine type of the data processing system, wherein the machine type represents a server, a workstation, a desktop computer, a notebook computer, a handheld computer, or an embedded computer;

a selectable purpose for the data processing system, wherein the selectable purpose represents real-time data processing, data storage management, communications management or general purpose use;

an installed application;

a combination of installed applications;

an executing application;

a combination of executing applications;

a current time of day;

a current day of week; and a processing load on the data processing system.

7. The method of claim 6 wherein performance of the behavioral algorithm is computed by weighting values of characteristics of the data processing system.

8. The method of claim 6 wherein a type of behavioral algorithm is selected by a table of characteristics of the data processing system.

9. A computer program product in a computer-readable medium for use in a data processing system for managing memory, the computer program product comprising:

first instructions for dynamically accepting a control variable from an executing application; and second instructions for managing deallocation of memory by a garbage collector executing in the data processing system according to a behavioral algorithm based on the control variable.

10. The computer program product of claim 9 further comprising:

instructions for monitoring a set of environment variables for the data processing system;

instructions for detecting an update of the control variable in the set of environment variables;

instructions for retrieving a value of the updated control variable by the garbage collector; and instructions for selecting the behavioral algorithm based on the value of the updated control variable.

11. The computer program product of claim 9 further comprising:

instructions for registering a routine to be called for notification of an update of the control variable for the data processing system;

instructions for detecting an update of the control variable for the data processing system;

instructions for calling the registered routine; and instructions for selecting the behavioral algorithm based on a value of the updated control variable.

12. The computer program product of claim 11 wherein the routine is registered as a hook.

13. The computer program product of claim 9 further comprising:

instructions for registering for a notification of an update of the control variable;

instructions for detecting an update of the control variable;

instructions for sending the notification of the update of the control variable; and instructions for selecting the behavioral algorithm based on a value of the updated control variable.

14. The computer program product of claim 9 wherein the control variable is dynamically set by a user of the data processing system.

15. The computer program product of claim 9 wherein the control variable is dynamically set by a user invoking an update of the control variable through a command line interface.

16. The computer program product of claim 9 wherein the control variable represents one or more characteristics of the data processing system selected from the group of:

an amount of memory installed in the data processing system;

a number of processors installed in the data processing system;

a clock speed of a processor installed in the data processing system;

a machine type of the data processing system, wherein the machine type represents a server, a workstation, a desktop computer, a notebook computer, a handheld computer, or an embedded computer;

a selectable purpose for the data processing system, wherein the selectable purpose represents real-time data processing, data storage management, communications management or general purpose use;

an installed application;

a combination of installed applications;

an executing application;

a combination of executing applications;

a current time of day;

a current day of week; and a processing load on the data processing system.

17. The computer program product of claim 16 wherein performance of the behavioral algorithm is computed by weighting values of characteristics of the data processing system.

18. The computer program product of claim 9 wherein the behavioral algorithm directs one or more characteristics of the garbage collector selected from the group of:

a frequency of memory managing actions;

an amount of processor time used for memory managing actions; and a number of objects in memory to be checked by the garbage collector.

19. The computer program product of claim 9 wherein the control variable selects one of a set of discrete values for performance of the behavioral algorithm.

20. The computer program product of claim 19 wherein the set of discrete values comprises low, moderate, or high performance.

21. The computer program product of claim 9 wherein the control variable toggles on/off managing actions of the garbage collector.

22. The computer program product of claim 9 wherein the control variable selects a type of behavioral algorithm for the garbage collector.

23. A computer program product in a computer-readable medium for use in a data processing system for managing memory, the computer program product comprising:

first instructions for dynamically accepting a control variable that defines a characteristic of the computer system on which said computer program product is executing; and second instructions for a garbage collector having a first behavior on a first computer system according to the control variable and a second behavior on a second computer system according to the control variable.

24. A data processing system comprising:

setting means for dynamically setting a control variable that defines a characteristic of said data processing system; and managing means for managing deallocation of memory by a garbage collector executing in the data processing system according to a behavioral algorithm based on the control variable.

25. The data processing system of claim 24 further comprising:

monitoring means for monitoring a set of environment variables for the data processing system;

detecting means for detecting an update of the control variable in the set of environment variables;

retrieving means for retrieving a value of the updated control variable by the garbage collector; and selecting means for selecting the behavioral algorithm based on the value of the updated control variable.

26. The data processing system of claim 24 wherein the control variable selects one of a set of discrete values for performance of the behavioral algorithm.

27. The data processing system of claim 24 wherein the control variable selects a type of behavioral algorithm for the garbage collector.

28. A computer program product in a computer-readable medium for use in a data processing system for managing memory, the computer program product comprising:

a plurality of algorithms for managing deallocation of memory by a garbage collector executing in the data processing system, one of said plurality of algorithms being dynamically chosen for execution according to a value for at least one environmental variable, whereby said computer program product can be installed in a variety of processing systems without modification.

29. The computer program product of claim 28, wherein said environmental variable is chosen from a group of variables consisting of:

an amount of memory installed in the data processing system, a number of processors installed in the data processing system, a clock speed of a processor installed in the data processing system, a machine type of the data processing system, a selectable purpose for the data processing system, a property of one or more applications, a current time of day, a current day of week, and a processing load on the data processing system.

30. The computer program product of claim 28, wherein changes in a value of said at least one environmental variable is checked only when the data processing system boots up.

31. The computer program product of claim 28, wherein changes in a value of said at least one environmental variable can be determined during runtime.

32. A method for managing memory in a data processing system, the method comprising the computer-implemented steps of:

accepting a defining parameter that defines a parameter of the data processing system or a property of an application executing on said data processing system;

choosing an algorithm from a plurality of algorithms according to a value of said defining parameter, managing deallocation of memory using said algorithm.

33. The method of claim 32, wherein said defining parameter is from the group consisting of the amount of memory installed in the data processing system, the number of processors installed in the data processing system, the clock speed of a processor installed in the data processing system, and the machine type of the data processing system.

34. The method of claim 32, wherein said algorithm can be modified at run-time by an executing application.

* * * * *